Jan. 13, 1931.  W. K. ANDREW ET AL  1,788,652
CLAMPING DEVICE
Filed March 22, 1926
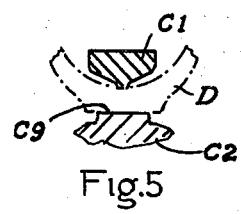
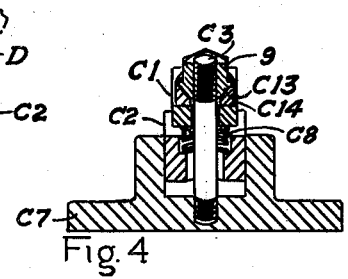
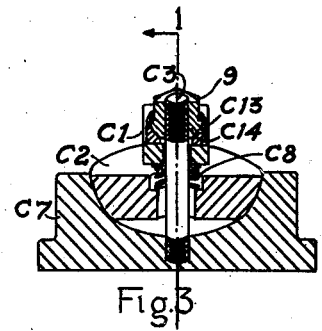
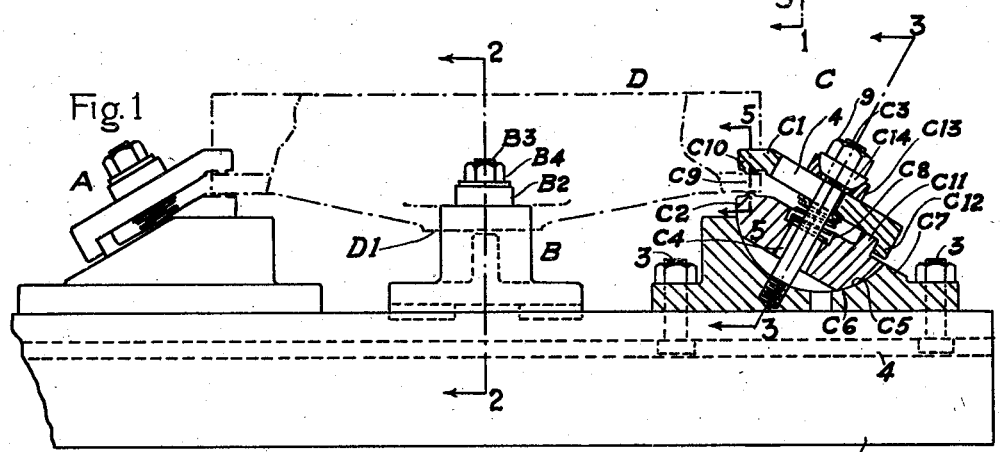
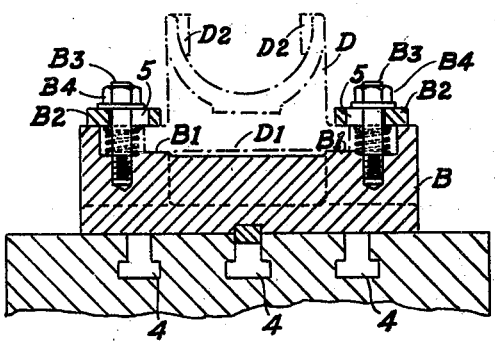
INVENTORS
William K Andrew
Paul E Butgin
BY
Fred G Parsons
ATTORNEY Patented Jan. 13, 1931

1,788,652

UNITED STATES PATENT OFFICE

WILLIAM K. ANDREW AND PAUL E. BUTZIN, OF MILWAUKEE, WISCONSIN, ASSIGNORS TO KEARNEY & TRECKER CORPORATION, OF WEST ALLIS, MICHIGAN

CLAMPING DEVICE

Application filed March 22, 1926. Serial No. 96,667.

This invention relates to clamping devices and more particularly to a type of clamping device adapted to secure work pieces at various points without unequalized strain and consequent distortion of the work pieces.

When the nature of the work piece is such that it must be located or positioned from a relatively minor surface portion for machining operations at a point relatively distant from the locating surface or portion, it is of great importance that no unbalanced strains should be set up by supports or clamps which are applied to steady the portions relatively distant from the locating portion, and it is a purpose of the invention to avoid distortion of even relatively frail work pieces under such conditions.

Another purpose is to provide clamping devices whereby one or more clamps may be applied for initially locating or positioning a work piece, after which one or more other clamps or supports may be later applied at other points on the work piece without the possibility of setting up unbalanced strains tending to distort the work.

Another object is to simplify and improve the construction and operation of clamping devices.

Still other objects will be apparent from this disclosure to those familiar with the art within which this invention is applied.

The invention consists in certain novel features of construction, arrangement and combination of parts as hereinafter particularly described and claimed.

In the accompanying drawings, the same reference characters are used for the same parts in each of the several views.

Fig. 1 is a front elevation of a preferred form of the device applied to an illustrative work piece, being partly in section along line 1—1 of Fig. 3.

Fig. 2 is a sectional elevation along line 2—2 of Fig. 1.

Fig. 3 is a sectional view of the right hand clamp unit taken along line 3—3 of Fig. 1.

Fig. 4 is a sectional view of an alternative construction for certain purposes as will be explained.

Fig. 5 is a vertical partial section along line 5—5 of Fig. 1.

A base 1, which may be the table of the machine tool with which the machining operation is to be performed, has fixed upon it the clamping or supporting units A, B, C, which are in this instance removable and relatively adjustable, being fixed with the base by the means of T bolts 3 engaging with T slots 4 in a well known manner. A work piece D is initially located and clamped by the means of the unit B, there being a relatively minor surface D1 from which it is desired to position the machining operation on surfaces D2 which extend the full length of the work piece. Unit B is provided with locating surfaces B1 upon which the surface D1 rests, the piece D being rigidly clamped in this position by the means of a plurality of straps or clamp members B2 each provided with a stud B3 and clamp nut B4. The straps B2 are slotted at 5, and when the nuts are loosened may be pulled back to permit removal of the work piece.

The ends of the work piece project in opposite directions from the unit B and it is necessary to support each end rigidly for the machining. This is accomplished by the means of the units A and C which support the respective ends. The units A and C being exactly alike in all respects, only the unit C will be described in detail.

Unit C is provided with clamp jaws C1 and C2 adapted to grip the upper and lower faces of the projecting end of the work piece D. A threaded stud C3 passes freely through a slotted hole 4 in the jaw C1 and through an enlarged hole C4 in the jaw C2. The lower surface C5 of jaw C2 is in the form of a section of a sphere for which a complementary surface C6 is provided in the base or socket member C7 with which the stud C3 is fixed. A spring C8 tends to separate the jaws when nut 9 is loosened. The jaw C1 may then be drawn to the right of Fig. 1 by virtue of the slot 4, for removal of the work piece and stands in the withdrawn position during insertion of a new work piece and while the clamp straps of the unit B are being set up. During the setting up of the clamp straps of unit B, if the work piece contacts with the jaw C2 the jaw is free to move about in its spherical seat and thus no strain is set up on the work piece. After the unit B is adjusted the jaw C2 may be manipulated in its spherical seat until the gripping portion C9 rests against the lower surface of the work piece. The jaw C2 may require movement of rotation about a horizontal axis passing through the center of the sphere corresponding to the spherical portion C5 in order to raise or lower the portion C9 to contact with work pieces in which the portion contacted varies in vertical spacing from the surface D1. The portion C9 is therefore made of relatively narrow face in the one direction as shown in Fig. 1 where it contacts the work, since such rotation would render a wide face ineffective.

To provide ample area for the portion C9 it is made relatively wider in the other direction as shown in Fig. 5 and in order to be positioned to contact the work piece over the full width as shown in Fig. 5 the jaw C2 may require rotation about a vertical axis passing through the center of the sphere corresponding to the spherical portion C5.

Having brought the jaw C1 into contact with the work piece, as described, the jaw C2 may now be set forward to bring the portion C10 of this jaw directly over the portion C9 of jaw C2. Since most of the cutting strains are downward in the majority of machining operations the upper work contacting portion C10 may be made of relatively small area which will contact with the work surface over practically its entire extent in spite of the fact that the jaw C1 in this instance partakes of the rotational movements described; but since such rotational movements may bring about an angular relationship between the surface of the jaw C1 and the axis of the stud C3 an equalizing washer C13 is set under nut 9, there being a spherical seat in the washer complementary to the spherical form of the lower portion C14 of nut 9 as particularly shown in Fig. 1. By the construction shown a bodily shifting of jaw C1 transverse to the axis of the stud may take place when necessary to the rotational jaw movements previously described and the washer C13 may accommodate itself to any angularity of the surface of the jaw as nut 9 is tightened.

To locate the portion C10 with reference to the portion C9 when jaw C1 is set forward a stop C11 is fixed on the jaw C2 and a complementary stop C12 is fixed on the jaw C1. The stud C3 is disposed at an angle with the surface of the base 1, as shown in Fig. 1, for various reasons of convenience, but mainly in order that as the clamps are tightened there will be a practically equal tendency to move the portion 9 upwardly and the portion C10 downwardly. As the nut C9 is set forward to tighten the clamps there is a certain amount of frictional resistance to be overcome between the surfaces C5 and C6 before the portion C9 can move upwardly even the trifling amount necessary and the angular position of stud C3 is of material benefit in reducing such resistance to a negligible minimum since the direction of motion applied by the nut to the jaw C2 is thus more nearly in the direction of the motion desired of the portion C9.

From the foregoing description it will be seen that the tightening of the nut 9 will cause the jaws C1 and C2 to be clamped tightly on opposite sides of the work piece where they contact therewith, and as the tightening proceeds the washer C14 and the jaw C2 will, without special attention, find such positions in their respective spherical seats as will correspond to the position and form of the particular work piece without setting up any unbalanced strain therein, and when the nut 9 is finally seated the jaws will be rigidly fixed relative to base 1 being prevented by the frictional contact of the various parts from moving from such position, whereby the projecting end of the work piece will be rigidly supported in whatever position it may occupy.

As previously mentioned the unit A is a duplicate of the unit, whereby each end of the work piece may be similarly clamped in position.

When the nature of the work is such that a substantial area is not required for the portion C9 of jaw C2 the portion C9 may be made of relatively small dimensions in each direction and it then becomes unnecessary to provide for rotational movement of the jaw C2 about a vertical axis. The spherical form of the surface C5 and its complementary seat C6 may then be changed to a form corresponding to a portion of the surface of a cylinder having a horizontal axis. The sectional view of unit C in Fig. 1 illustrates such a construction equally with the construction previously described, but the transverse section is then different as shown in Fig. 4.

We claim:

1. In a clamping device the combination with a base and a first clamp means adapted to determine and fix the position of a work piece relative to said base, of a second clamp means having a plurality of jaws each movable to respectively grip a portion of said work piece on opposite sides thereof when the work piece is in said position, and means for simultaneously adjusting each of said jaws to engage said work piece portion in said position and to fix the position of each of said jaws relative to said base in accordance with the position of the work piece determined by said first clamp means.

2. In a clamping device, the combination with a base and a first clamp unit adapted to determine and fix the position of a work piece relative to said base, of a second clamp unit including a first jaw movable to engage a portion of said work piece from one direction when the work piece is in said position, a second jaw movable about an axis at right angles to the direction of movement of said first jaw whereby to grip the work piece portion from the other direction, and means for simultaneously moving each of said jaws to grip the work piece portion in said position and to fix each of said jaws with said base.

3. In a clamping device, the combination with a base and a first clamp means adapted to determine and fix the position of a work piece relative to said base, of a second clamp means including a first jaw movable to engage and clamp a portion of said work piece from one direction when the work piece is in said position, a second jaw movable about a plurality of axes one of which is approximately parallel with and the other of which is approximately at right angles to the direction of movement of the first jaw, whereby the second jaw may move about the one or the other of said axes to conform to the position of the work piece portion and to engage and clamp it from the other direction, and means for simultaneously moving each of said jaws to clamp the work piece portion in said position and to clamp each of said jaws with said base.

4. In a clamping device, the combination with a base and a first clamp means adapted to determine and fix the position of a work piece relative to said base, of a second clamp means including a first jaw movable in a first direction to engage a portion of said work piece when the work piece is in said position, a socket member fixed with said base and providing surface portions of substantially circular form in a plane parallel to the movement of said first jaw, a second jaw having opposite end portions fitted to the circular form of said socket, said socket being positioned so that movement of the jaw within the socket will cause a portion of the jaw to engage the work piece portion in a direction opposite to the engagement of the first jaw, and means for simultaneously moving each of said jaws to engage the work piece portion in said position and to clamp said second jaw in said socket member.

5. In a device of the nature disclosed the combination of clamp means including first and second relatively movable jaw members providing mutually reacting pressure surfaces, a socket having surfaces substantially conforming to portions of a circle in a plane parallel to the relative movement of said jaws, said second jaw being provided with portions seating on and complementary to the surfaces of said socket whereby the jaw is guided for movement about an axis coinciding with the center of said circle, and means for simultaneously establishing pressure between said jaws and between said socket and the jaw portion seated thereon, whereby said jaws are locked together and said second jaw is simultaneously locked with said member.

6. In a clamping device including a base the combination of a plurality of jaws relatively movable toward one another and together bodily movable about an axis transverse to the movement of the one jaw toward the other, and means associated with said base for simultaneously setting up each of said movements, whereby to move said jaws to conform to varying positions of a portion of different work pieces fixed with said base.

7. In a clamping device the combination with a base and a first clamp unit adapted to determine and fix the position of a work piece relative to said base; of a plurality of other clamp units each having a plurality of jaws respectively movable to grip a portion of said work piece on opposite sides thereof when the work piece is in said position, and a plurality of manually operable clamp levers respectively operable for different clamp units for simultaneously adjusting each of the jaws of the clamp unit with which the lever is associated to engage the work piece portion in said position and to clamp each jaw relative to said base, each of said other clamp units being adapted to fix the position of the jaws thereof in accordance with the position of the work piece determined by said first clamp unit.

8. In a clamping device, the combination with a base and a first clamp means including a work contacting portion fixed with said base and adapted to determine and fix the position of a work piece relative to said base, of a second clamp means including a socket member having a jaw seat surface substantially conforming to a portion of the surface of a sphere, a first clamp jaw seated therein and having a centrally disposed opening, a second clamp jaw adjacent said first clamp jaw and having a slotted opening, said jaws each being provided at adjacent ends with work contacting surfaces each movable toward one another, said jaws being also relatively movable in another direction, stops for the relative positioning of said jaws when moved in said other direction, a stud fixed with said member and passing through the openings of said jaws, a nut engaging a threaded end of said stud, and an equalizing washer disposed between said nut and the clamp jaw adjacent thereto.

In witness whereof we have hereto affixed our signatures.

WILLIAM K. ANDREW.
PAUL E. BUTZIN.